United States Patent
Gardynik et al.

(10) Patent No.: US 9,656,627 B2
(45) Date of Patent: May 23, 2017

(54) HOOD BUMPERS TO ABSORB LOADING

(71) Applicant: FORD GLOBAL TECHNOLOGIES, LLC, Dearborn, MI (US)

(72) Inventors: Michael J. Gardynik, Farmington Hills, MI (US); Thomas J. Joseph, Chesterfield, MI (US); Ed Wilson, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/876,122

(22) Filed: Oct. 6, 2015

(65) Prior Publication Data
US 2017/0096119 A1 Apr. 6, 2017

(51) Int. Cl.
B60R 21/34 (2011.01)
B62D 25/12 (2006.01)
E05F 5/02 (2006.01)
B60R 21/00 (2006.01)

(52) U.S. Cl.
CPC .............. B60R 21/34 (2013.01); B62D 25/12 (2013.01); E05F 5/022 (2013.01); B60R 2021/0048 (2013.01); B60R 2021/343 (2013.01); E05Y 2900/536 (2013.01)

(58) Field of Classification Search
CPC .............. B60R 21/34; B60R 2021/343; B60R 2021/0048; B62D 25/12; E05F 5/022; E05Y 2900/536
See application file for complete search history.

(56) References Cited

U.S. PATENT DOCUMENTS

| 6,039,388 A | 3/2000 | Choi | |
| 6,318,795 B1 * | 11/2001 | Pyo | B60J 5/101 16/82 |
| 7,690,722 B2 * | 4/2010 | Boggess | B60R 21/34 296/187.04 |
| 7,878,578 B2 * | 2/2011 | Iwai | B60R 21/34 180/69.2 |

(Continued)

FOREIGN PATENT DOCUMENTS

| CN | 203255110 U | 10/2013 |
| EP | 2840215 A1 | 2/2015 |
| KR | 100802847 B1 | 2/2008 |

OTHER PUBLICATIONS

English machine translation of CN 203255110.
English machine translation of KR 100802847.

Primary Examiner — Drew Brown
(74) Attorney, Agent, or Firm — Jason Rogers; King & Schickli, PLLC

(57) ABSTRACT

A hood bumper for a vehicle includes a foundation, a pair of legs extending from the foundation in a first direction, a support extending from the foundation in a second direction, and a head adhered to the support. At least a portion of the support is a first material and the head is a second material such that the first material is harder than the second material. The support includes first and second portions extending between the foundation and the head which are mirror images. The head is designed to deform and the support is designed to collapse under force. In alternate embodiments, the foundation and/or support are designed to fracture under force. The hood bumper is coextruded so the base and head have fixed heights and cross sections.

19 Claims, 4 Drawing Sheets

(56) References Cited

U.S. PATENT DOCUMENTS

| | | |
|---|---|---|
| 8,616,622 B2 | 12/2013 | Davis et al. |
| 8,991,537 B2 | 3/2015 | Snede et al. |
| 9,068,387 B2 * | 6/2015 | Lim ........................ E05F 5/022 |
| 2006/0226679 A1 * | 10/2006 | Mairing ................... B60R 21/34 |
| | | 296/187.04 |
| 2006/0237998 A1 | 10/2006 | Andre et al. |
| 2008/0284210 A1 * | 11/2008 | Bauer ...................... E05F 5/022 |
| | | 296/207 |
| 2009/0102239 A1 * | 4/2009 | Iwai ........................ B60R 21/34 |
| | | 296/193.11 |
| 2014/0091600 A1 * | 4/2014 | Lusky ..................... E05F 5/022 |
| | | 296/207 |
| 2014/0196261 A1 * | 7/2014 | Kamiya .................. E05F 5/022 |
| | | 24/591.1 |
| 2016/0076294 A1 * | 3/2016 | Alexander .............. E05F 5/022 |
| | | 16/86 R |

\* cited by examiner

HOOD BUMPERS TO ABSORB LOADING

TECHNICAL FIELD

This document relates generally to energy absorbing structures for motor vehicles. More particularly, the document relates to a coextruded hood bumper incorporating features to absorb loads.

BACKGROUND

Modern motor vehicles include a variety of safety features to protect occupants of the vehicle in the event of a collision, including such elements as safety belts, air bags, and front and rear bumpers. Other safety features are provided to provide as much protection as possible to a pedestrian in the event of a vehicle-pedestrian low speed collision (for example, less than 15 kph). As is known, such safety features typically include an energy absorber component. Such energy absorber components intended for impact protection in the event of a vehicle-to-pedestrian impact are typically provided as deformable and/or collapsible elements, designed to absorb as much impact energy as possible early in the impact to maximize pedestrian protection to the extent possible.

Many jurisdictions now include as part of their safety regulations requirements that vehicle hood assemblies be constructed to provide protection to the pedestrian in the event of a vehicle-pedestrian collision. Specifically, these safety regulations include head impact criteria related to the hood of the vehicle. One limiting factor in the design of hoods to meet these regulations is the use of bumpers to meet hood overslam performance requirements. The bumpers provide support, generally along a radiator support near a front of the hood and along fenders near edges of the hood, and absorb road loads while driving and customer usage loads associated with opening/closing the hood (e.g., after servicing the vehicle).

Hood bumpers are typically single piece injection molded parts manufactured in a single durometer or hardness. These single piece/durometer bumpers lack sufficient energy absorption, however, to meet the head impact criteria associated with pedestrian protection. Even more, the bumpers create localized high stiffness areas around the hood at the location of each bumper. These high stiffness areas can lead to design trade-offs between meeting hood overslam performance requirements and pedestrian protection requirements. More specifically, hood bumpers that are too stiff may require positioning outside of pedestrian protection zones of the hood leading to reduced hood system performance relating to both hood overslam performance requirements and pedestrian protection requirements.

Accordingly, a need is identified for a vehicle hood bumper capable of being positioned inside of pedestrian protection zones of the hood while allowing hood system performance relating to both hood overslam performance requirements and pedestrian protection requirements.

SUMMARY OF THE INVENTION

In accordance with the purposes and benefits described herein, a hood bumper for a vehicle includes a base having a fixed height and cross section, and a head adhered to the base and having a fixed height and cross section.

In another possible embodiment, the base is a first material and the head is second material such that the first material has a higher durometer than the second material. In another, the base includes a mounting feature for attaching the hood bumper to the vehicle, and a support. In still another possible embodiment, the support supports the head a distance above the mounting feature.

In yet another possible embodiment, the base further includes a fracture feature having first and second grooves adjacent said support member, said first and second grooves configured such that a force applied to said head causes said support to fracture said base along at least one of said first and second grooves.

In yet still another possible embodiment, the base further includes a fracture feature, the fracture feature having includes upper and lower tiers, said lower tier forming first and second ledges attached to said upper tier, said first and second ledges configured such that a force applied to said head causes said upper tier to fracture at least one of said first and second ledges.

In still one additional possible embodiment, the head is configured to absorb normal loads associated with use of the vehicle. In another, the fracture feature is configured to fracture under abnormal loads associated with use of the vehicle. In still another, the support is configured to collapse under abnormal loads associated with use of the vehicle.

In one other possible embodiment, a coextruded hood bumper for a vehicle includes a first material forming a base, and a second material forming a head adhered to said base. In another, the first material has a higher durometer than said second material.

In another possible embodiment, the base includes a foundation and a support member, said support member extending a distance from said foundation and adhering to said head. In yet another possible embodiment, the foundation includes at least one groove adjacent said support member, said at least one groove configured such that a force applied to said head causes said support member to fracture said foundation along said at least one groove.

In still another possible embodiment, the support member includes upper and lower tiers, said lower tier forming at least one ledge attached to said upper tier, said ledges configured such that a force applied to said head causes said upper tier to fracture said at least one ledge.

In one more additional embodiment, a coextruded hood bumper for a vehicle includes a foundation, a pair of legs extending from said foundation in a first direction, a support extending from said foundation in a second direction, and a head adhered to said support, wherein at least said support is a first material and said head is a second material, and said first material is harder than said second material.

In another possible embodiment, the support includes first and second tiers extending between said foundation and said head, and said first and second tiers are mirror images of one another.

In still another possible embodiment, the head deforms and said support collapses under force.

In yet another possible embodiment, the foundation includes first and second grooves adjacent said support, said first and second grooves configured such that a force applied to said head causes said support to fracture said foundation along said first and second grooves.

In still yet another, the support includes upper and lower tiers, said lower tier forming first and second ledges attached to said upper tier, said first and second ledges configured such that a force applied to said head causes said upper tier to fracture at least one of said first and second ledges.

A vehicle incorporating any of the hood bumpers described above.

In the following description, there are shown and described several preferred embodiments of the hood bumpers for a vehicle. As it should be realized, the bumpers are capable of other, different embodiments and their several details are capable of modification in various, obvious aspects all without departing from the assemblies as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the hood bumpers for a vehicle and together with the description serve to explain certain principles thereof. In the drawing figures.

Reference will now be made in detail to the present preferred embodiments of the hood bumpers for a vehicle, examples of which are illustrated in the accompanying drawing figures, wherein like numerals are used to represent like elements.

DETAILED DESCRIPTION

Figure 1:
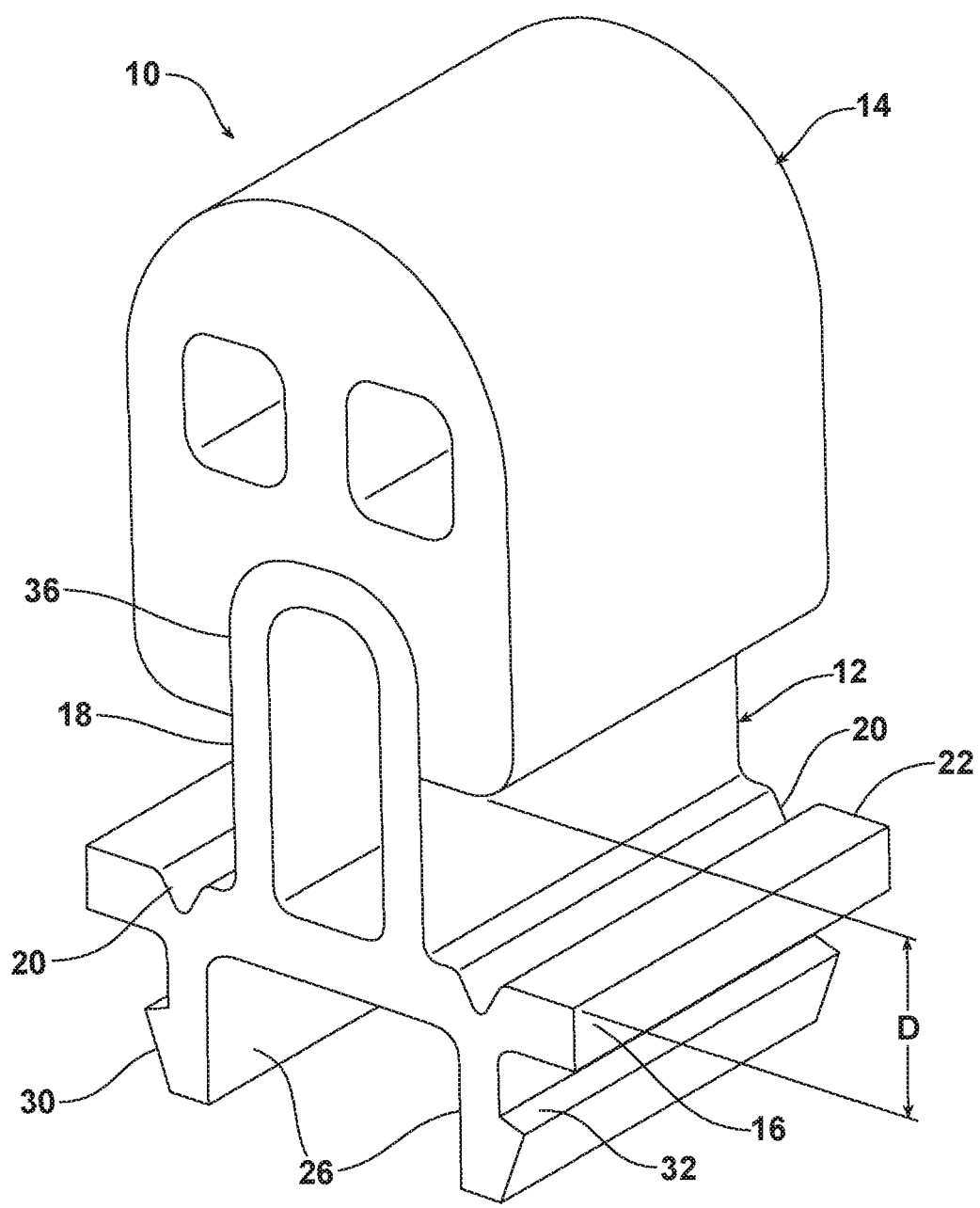
FIG. 1 is an isometric view of a hood bumper for a vehicle.

Reference is now made to FIG. 1 which illustrates a hood bumper 10 for a vehicle. The hood bumper 10 includes a base 12 made of a first material and a head 14 adhered to the base made of a second material. In the described embodiment, the base 12 and head 14 are coextruded as a single piece resulting in the base having a fixed height and cross section and the head having a fixed height and cross section. In other words, a height of the hood bumper 10 is not adjustable once manufactured.

In addition, the first material used to manufacture the base 12 has a higher durometer or stiffness than the second material used to manufacture the head 14. In other words, the base 12 is stiffer than the head 14. The purpose of coextruding the hood bumper 10 is to provide this dual stiffness scenario in order to accommodate the requirements associated with meeting both the hood overslam performance requirements and the pedestrian protection requirements. In other words, the head 14 of the hood bumper 10 is primarily configured to absorb normal loads associated with use of the vehicle (e.g., loads/forces associated with closing the hood and loads/forces associated with driving, i.e., road load forces) while the base 12 of the hood bumper 10 is primarily configured to accommodate abnormal loads associated with use of the vehicle (e.g., loads/forces associated with collisions including vehicle-pedestrian low speed collisions).

In the described embodiment, the base 12 includes a mounting feature 16 for attaching or mounting the hood bumper 10 to the vehicle, a support 18, and a fracture feature 20. As shown in FIG. 1 and best shown in FIG. 2, the base 12 further includes a flange or foundation 22 supported by a vehicle support 24 and a pair of legs 26. The vehicle support 24 may be a radiator support, a fender, or other part of the vehicle, for example.

As shown, the pair of legs 26 extend from the foundation 22 in a first direction through an aperture 28 in the vehicle support 24 securing the hood bumper 10 in position. In the described embodiment, the pair of legs 26 include angled lower surfaces 30 which contact the vehicle support 24 during insertion through the aperture 28. The contact causes the pair of legs 26 to deflect inward allowing the legs to traverse the aperture 28. Once through the aperture, the pair of legs 26 spring back or return to their original position such that an angled upper surface 32 contacts or is adjacent to the vehicle support 24 preventing removal of the hood bumper 10. In other words, the angled upper surfaces 32 act as a flange preventing the hood bumper 10 from being pulled back through the aperture 28. In alternate embodiments, the pair of legs 26 could be replaced with a single member (e.g., a conical shaped member) having an angled upper surface for contacting the vehicle bracket 24. Essentially a member of any shape sufficient to prevent withdrawal of the hood bumper 10 would be sufficient.

Figure 2:
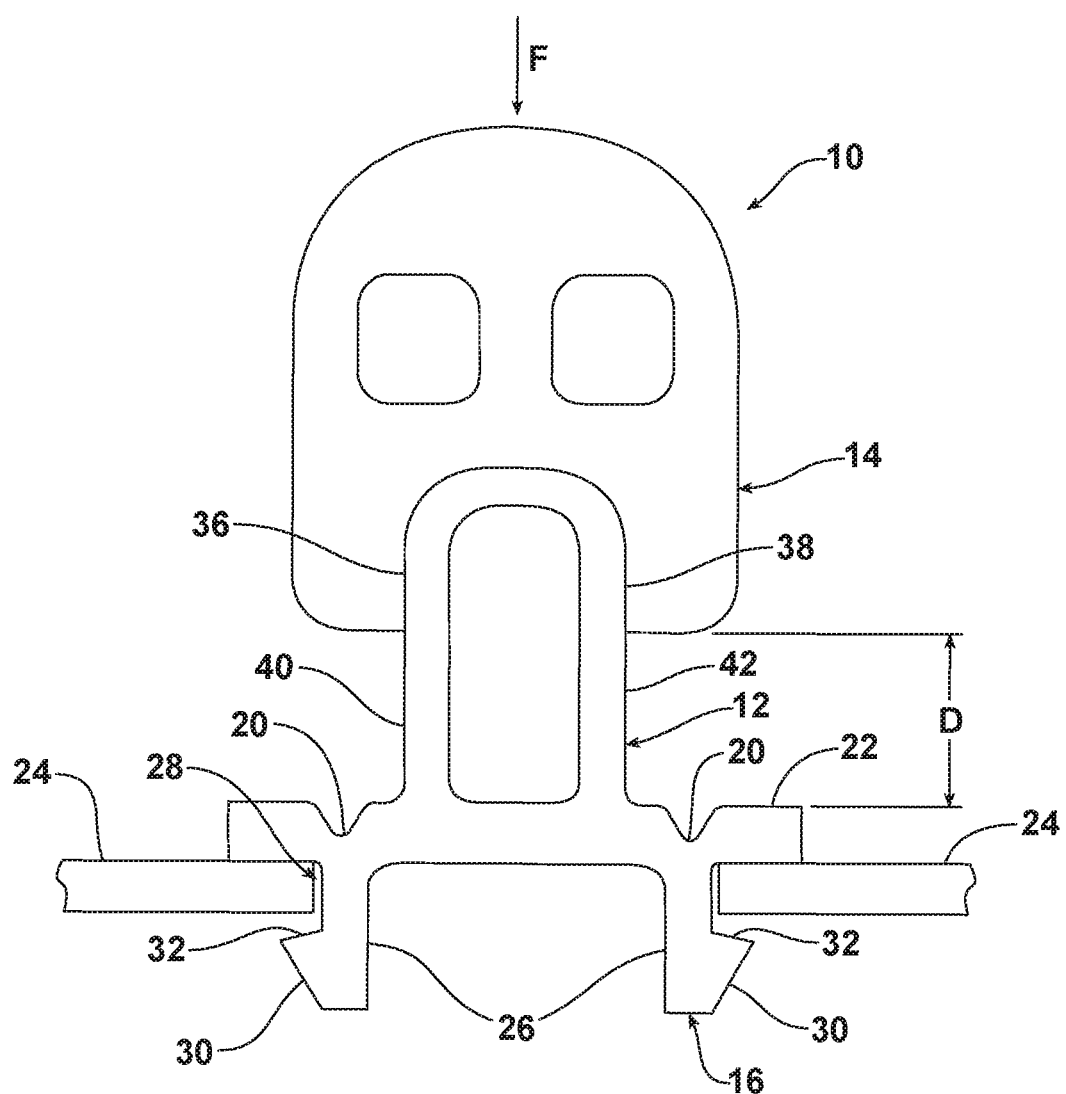
FIG. 2 is a cross sectional front view of the hood bumper mounted to the vehicle.

As best shown in FIG. 2, the support 18, or support member, extends from the foundation 22 in a second direction and supports the head 14 a distance (D) above the foundation. In the described embodiment, the first and second directions are substantially opposite one another but alternate embodiments could require the first and second directions be perpendicular or angular to accommodate differing mounting requirements of the vehicle.

The support 18 is adhered to and supports the head 14. In the described embodiment, the support 18 is substantially U-shaped and only an end portion 36 of the support extends into a mating channel 38 formed in the head 14 and adheres to the head. In other words, an exterior surface of the end portion 36 is at least partially rounded and mates with an at least partially rounded interior surface of the head 14. As shown in FIGS. 1 and 2, the support 34 includes first and second portions 40, 42 extending between the head 14 and the foundation 22. The first and second portions 40, 42 are mirror images of one another and, in the embodiment shown, are simply upright legs.

Adjacent the first and second portions 40, 42, the fracture feature 20, which includes first and second generally V-shaped grooves in the described embodiment, is formed in the foundation 22. The first and second grooves 20 are designed to accommodate the abnormal forces primarily associated with vehicle-pedestrian low speed collisions while the head 14 is designed to absorb the normal or lesser forces as described above. In other words, the head 14 is designed to absorb normal forces applied to the head due to the durometer of the material while the stiffer material utilized for the base 12 is designed to accommodate the abnormal forces applied through the head 14. In the described embodiment, the first and second grooves 20 accommodate the abnormal forces by fracturing or breaking along the grooves. In other words, if the force acting on the head 14 fully deforms the head, then the force will further act on the base 12. Specifically, the support 18 directs the force onto the foundation 22 adjacent the first and second grooves 20 causing at least one of the grooves to fracture or break thereby absorbing the additional force.

Figure 3:
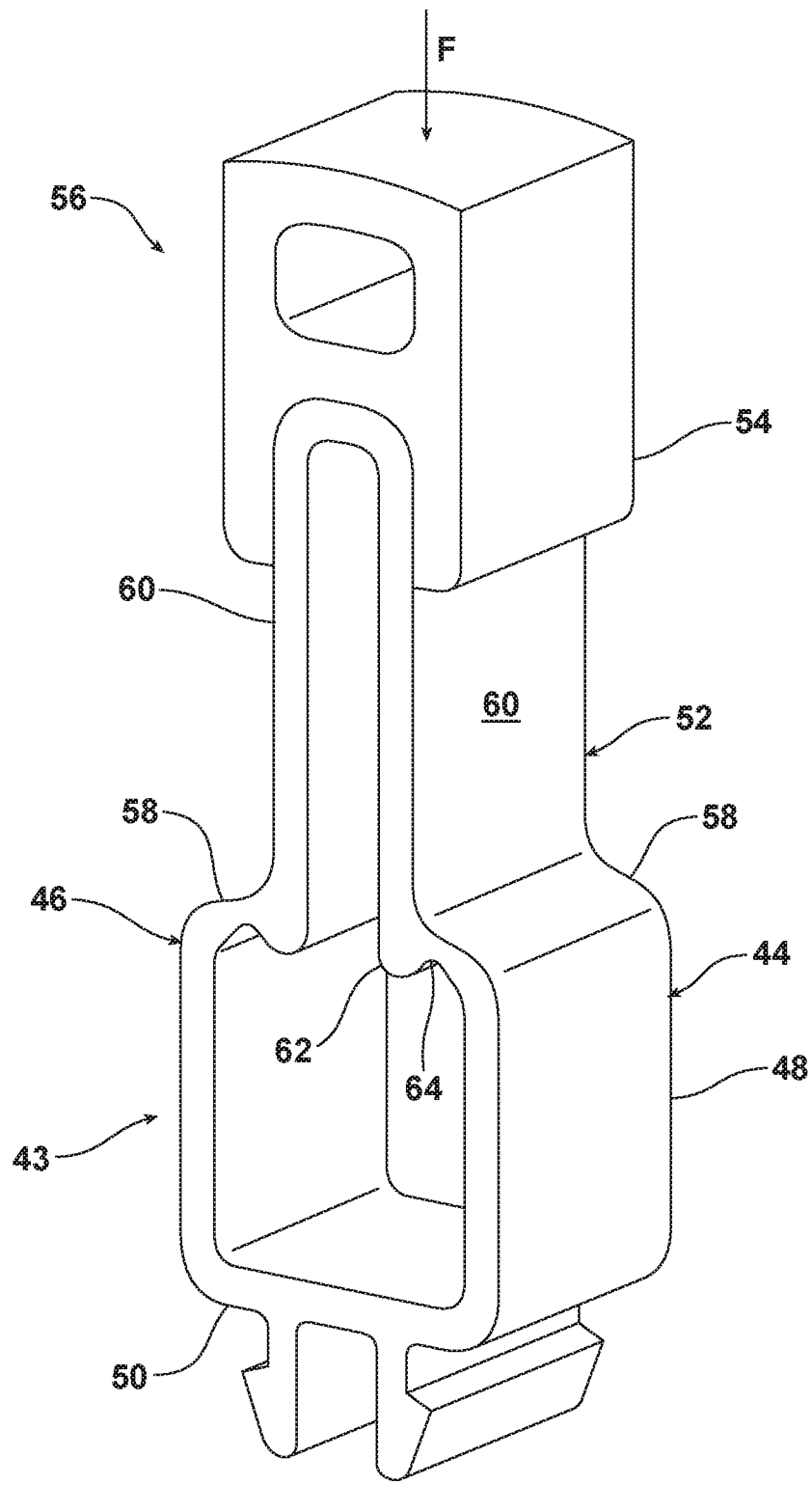
FIG. 3 is an isometric view of an alternate embodiment of a hood bumper for a vehicle.
Figure 4:
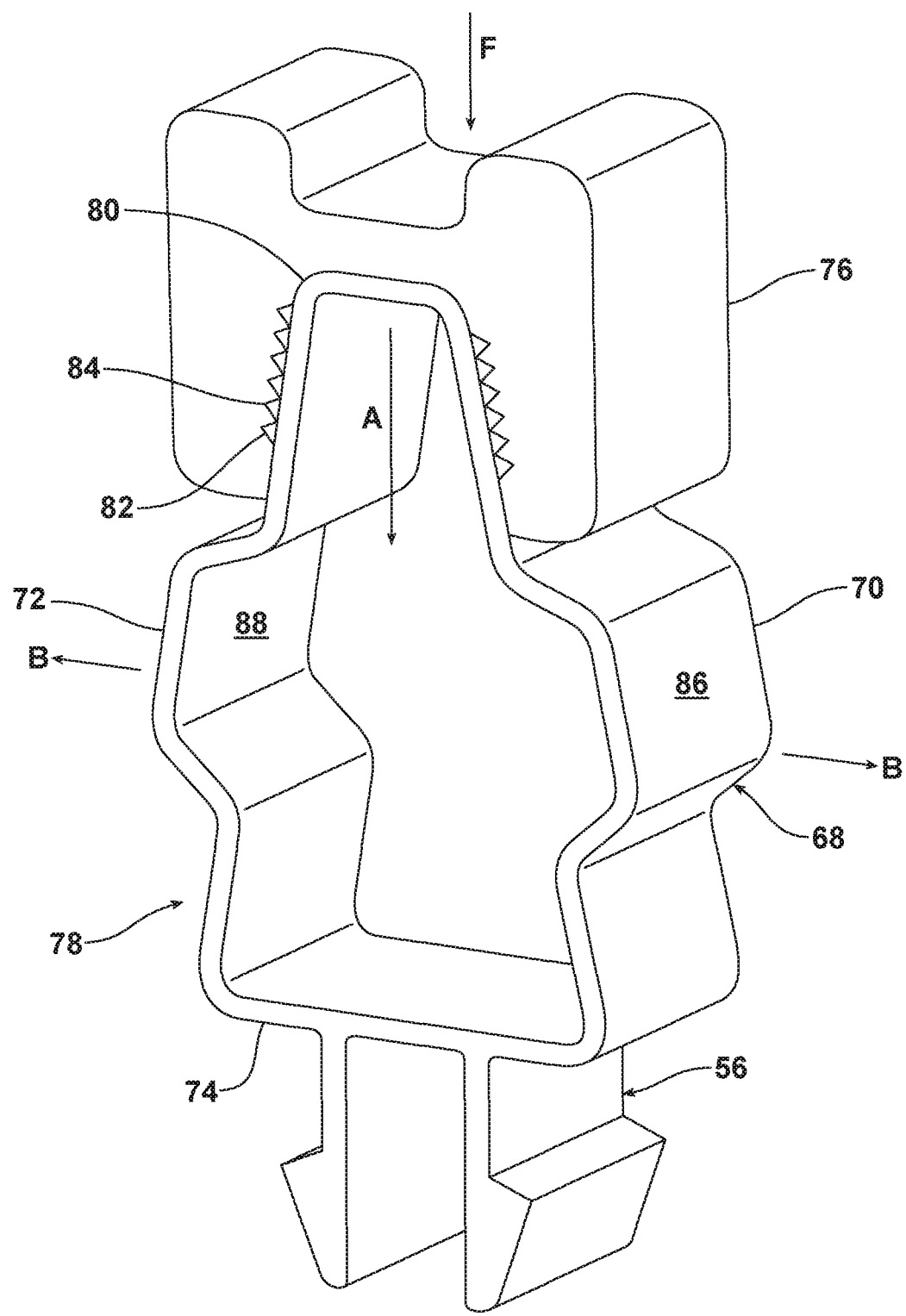
FIG. 4 is an isometric view of yet another alternate embodiment of a hood bumper for a vehicle.

As shown in FIGS. 3 and 4, however, the support, including the first and second portions of the support, can take many shapes and still function in accordance with the invention. In other words, the first and second portions can take virtually any shape so long as they accommodate the abnormal forces as described above. In the alternate embodiment shown in FIG. 3, a support 43 includes first and second portions 44, 46 which are elongated relative the first and second portions 40, 42 of support 18. Even more, the first and second portions 44, 46 are multi-tiered having a lower tier 48 adjacent the foundation 50 with a wider separation between portions than an upper tier 52 adjacent the head 54. As shown, the head 54 is generally cube-shaped in this embodiment of the hood bumper 56.

The difference in separation between the upper tier 52 and lower tier 48 creates first and second ledges 58. As shown, legs 60 of upper tier 52 extends below ledge 58 forming tear drops 62. At the same time, the ledges 58 are thinned adjacent the tear drops 62 as shown by reference numeral 64. Together, these features are designed to accommodate the abnormal forces applied through the head 54. In the embodiment shown in FIG. 3, the first and second ledges 58 accommodate the abnormal forces by fracturing or breaking along the thinner area 64. In other words, if the force acting on the head 54 fully deforms the head, then the force will further act on the base 12. Specifically, the legs 60 of the support 43 direct the force onto the ledges 58 causing at least one of the ledges to fracture or break thereby absorbing the additional force.

In still another alternate embodiment shown in FIG. 4, a support 68 made of a first material includes first and second portions 70, 72 extending between a foundation 74 and a head 76 of a hood bumper 78. An end portion 80 of the support 68 is substantially U-shaped and adheres to the head 76. Even more, an outer surface of the end portion 80 includes a plurality of external serrations 82 which adhere to a plurality of internal serrations 84 formed in the head 76. In other embodiments, shapes other than serrations may be used to provide additional surface area for improved adhesion in the manner the serrations do.

The support 68, in this alternate embodiment, is configured to accommodate the forces by collapsing under abnormal loads associated with use of the vehicle instead of fracturing. In other words, the support 68 collapses while under force and returns or springs back to its original position when the force is removed. As shown, the first and second portions 70, 72 are mirror images of one another and the head 76 is generally H-shaped in this embodiment. The head 76 is made of a second material that is softer than the first material to allow the head to initially deform under normal forces. In other words, if the force (F) acting on the head 76 fully deforms the head, then the force will further act on the base and support 68.

Specifically, the first and second portions 70, 72 receive the force (F) causing the first and second portions to collapse thereby absorbing the additional force. More specifically, the force (F) causes a downward movement of upper end 80 of the support 78 (shown by action arrow A) which forces walls 86 and 88 to expand outward as shown by action arrows B. Once the force is removed, the upper end 80 is pushed upward to its original position when the walls 86 and 88 retract to their original position.

In summary, numerous benefits result from a hood bumper for a vehicle having first and second materials having differing durometers forming a base 12 and a head 14. The differing materials provide vehicle hood bumpers capable of positioning inside of pedestrian protection zones of the hood while allowing hood system performance relating to both hood overslam performance requirements and pedestrian protection requirements to be achieved.

The foregoing has been presented for purposes of illustration and description. It is not intended to be exhaustive or to limit the embodiments to the precise form disclosed. Obvious modifications and variations are possible in light of the above teachings. For instance, while mirror image portions are shown in each of the figures, the first and second portions of the support are not limited to such an arrangement. First and second portions of differing or complimentary shapes can be utilized in alternate embodiments dependent upon design requirements. Even more, the base can be designed to either collapse or fracture in order to accommodate the abnormal loads described above. All such modifications and variations are within the scope of the appended claims when interpreted in accordance with the breadth to which they are fairly, legally and equitably entitled.

What is claimed:

1. A hood bumper for a vehicle, comprising:
a base having a fixed height and cross section, wherein said base includes a mounting feature for attaching the hood bumper to the vehicle, and a support; and
a head adhered to said base, said head having a fixed height and cross section,
wherein said base is a first material and said head is second material, said first material having a higher durometer than said second material,
wherein said support supports said head a distance above said mounting feature, and
wherein said base includes a fracture feature having first and second grooves adjacent said support member, said first and second grooves configured such that a force applied to said head causes said support to fracture said base along at least one of said first and second grooves.

2. The hood bumper for a vehicle of claim 1, wherein said fracture feature has upper and lower tiers, said lower tier forming first and second ledges attached to said upper tier, said first and second ledges configured such that a force applied to said head causes said upper tier to fracture at least one of said first and second ledges.

3. The hood bumper for a vehicle of claim 1, wherein said head is configured to absorb normal loads associated with use of the vehicle.

4. The hood bumper for a vehicle of claim 1, wherein said fracture feature is configured to fracture under abnormal loads associated with use of the vehicle.

5. The hood bumper for a vehicle of claim 1, wherein said support is configured to collapse under abnormal loads associated with use of the vehicle.

6. A coextruded hood bumper for a vehicle, comprising:
a first material forming a base; and
a second material forming a head adhered to said base;
wherein said first material has a higher durometer than said second material, said base includes a foundation and a support member, said support member extending a distance from said foundation and adhering to said head, and said foundation includes at least one groove adjacent said support member, said at least one groove configured such that a force applied to said head causes said support member to fracture said foundation along said at least one groove.

7. The coextruded hood bumper for a vehicle of claim 6, wherein said support member includes upper and lower tiers, said lower tier forming at least one ledge attached to said upper tier, said ledges configured such that a force applied to said head causes said upper tier to fracture said at least one ledge.

8. A vehicle including the coextruded hood bumper of claim 6.

9. A coextruded hood bumper for a vehicle, comprising:
a foundation;

a pair of legs extending from said foundation in a first direction;
a support extending from said foundation in a second direction; and
a head adhered to said support,
wherein at least said support is a first material and said head is a second material, and said first material is harder than said second material.

10. The coextruded hood bumper for a vehicle of claim 9, wherein said support includes first and second portions extending between said foundation and said head, and said first and second portions are mirror images of one another.

11. The coextruded hood bumper for a vehicle of claim 10, wherein said head deforms and said support collapses under force.

12. The coextruded hood bumper for a vehicle of claim 10, wherein said foundation includes first and second grooves adjacent said support, said first and second grooves configured such that a force applied to said head causes said support to fracture said foundation along said first and second grooves.

13. The coextruded hood bumper for a vehicle of claim 10, wherein said support includes upper and lower tiers, said lower tier forming first and second ledges attached to said upper tier, said first and second ledges configured such that a force applied to said head causes said upper tier to fracture at least one of said first and second ledges.

14. The coextruded hood bumper for a vehicle of claim 10, wherein said support is configured such that a force applied to said head causes at least one of said first and second supports to collapse from an initial position.

15. The coextruded hood bumper for a vehicle of claim 14, wherein said support is configured to return to said initial position upon removal of the force applied to said head.

16. The coextruded hood bumper for a vehicle of claim 10, wherein at least one of said first and second supports collapses under force.

17. The coextruded hood bumper for a vehicle of claim 16, wherein said at least one of said first and second supports expand outward under the force.

18. The coextruded hood bumper for a vehicle of claim 9, where said support includes a plurality of external serrations and said head includes a plurality of internal serrations mating with said plurality of external serrations.

19. A vehicle including the coextruded hood bumper of claim 9.

* * * * *